United States Patent
Lee

(10) Patent No.: US 12,060,051 B2
(45) Date of Patent: Aug. 13, 2024

(54) BRAKING CONTROL SYSTEM AND METHOD OF VEHICLE

(71) Applicants: Hyundai Motor Company, Seoul (KR); Kia Corporation, Seoul (KR)

(72) Inventor: Don Kee Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 17/487,715

(22) Filed: Sep. 28, 2021

(65) Prior Publication Data
US 2022/0289155 A1    Sep. 15, 2022

(30) Foreign Application Priority Data

Mar. 11, 2021  (KR) .................. 10-2021-0031742

(51) Int. Cl.
| | | |
|---|---|---|
| *B60T 8/88* | (2006.01) | |
| *B60T 8/58* | (2006.01) | |
| *B60T 13/58* | (2006.01) | |
| *B60T 13/68* | (2006.01) | |
| *B60T 13/74* | (2006.01) | |
| *B60T 17/22* | (2006.01) | |

(52) U.S. Cl.
CPC .............. *B60T 8/885* (2013.01); *B60T 8/58* (2013.01); *B60T 13/58* (2013.01); *B60T 13/686* (2013.01); *B60T 13/741* (2013.01); *B60T 17/221* (2013.01); *B60T 2220/04* (2013.01); *B60T 2240/00* (2013.01); *B60T 2250/04* (2013.01); *B60T 2270/10* (2013.01); *B60T 2270/402* (2013.01); *B60T 2270/403* (2013.01); *B60T 2270/406* (2013.01); *B60T 2270/88* (2013.01)

(58) Field of Classification Search
CPC ...... B60T 13/58; B60T 13/662; B60T 13/686; B60T 13/741; B60T 8/329; B60T 8/3205; B60T 8/58; B60T 8/55; B60T 8/885; B60T 7/04; B60T 7/042; B60T 17/22; B60T 17/221; B60T 17/043; B60T 2220/04; B60T 2250/04; B60T 2240/00
See application file for complete search history.

(56) References Cited

U.S. PATENT DOCUMENTS 5,139,315 A * 8/1992 Walenty ................ B60T 7/12
                                                           303/162
9,187,069 B2 * 11/2015 Nishikawa ............ B60T 8/1706
(Continued)

*Primary Examiner* — Logan M Kraft
*Assistant Examiner* — Johnny H Hoang
(74) *Attorney, Agent, or Firm* — Fox Rothschild LLP

(57) ABSTRACT

A braking control system and method of a vehicle are configured to safely stop the vehicle by determining whether a brake line fails via detecting a change in braking pressure and compensating for braking force through an engaging operation of an electric parking brake (EPB) when determining that the brake line fails in association with driver manipulation of the brake pedal. The braking control system includes: a vehicle speed detector; a wheel lock detector; a brake pedal operation detector that determines whether a brake pedal is operated; a brake line failure detector that determines whether the brake line fails when the brake pedal is operated; and a controller configured to engage the EPB when a current vehicle speed is equal to or greater than a predetermined vehicle speed, a current state is a wheel-unlock state, and the brake line fails.

20 Claims, 9 Drawing Sheets

(56) References Cited

U.S. PATENT DOCUMENTS

| | | | |
|---|---|---|---|
| 10,723,229 B1* | 7/2020 | Yao | B60L 7/10 |
| 2006/0170280 A1* | 8/2006 | Nakayama | B60T 8/261 |
| | | | 303/9.62 |
| 2008/0246335 A1* | 10/2008 | Spieker | B60T 8/885 |
| | | | 303/122.08 |
| 2014/0084673 A1* | 3/2014 | Matsuoka | B60T 13/142 |
| | | | 303/3 |
| 2016/0272170 A1* | 9/2016 | Moore | B60T 8/176 |
| 2017/0166180 A1* | 6/2017 | Chang | B60T 13/683 |
| 2018/0099652 A1* | 4/2018 | Jung | B60T 13/686 |
| 2018/0297574 A1* | 10/2018 | Zimmermann | B60T 8/4081 |
| 2019/0135285 A1* | 5/2019 | Goh | B60T 13/146 |
| 2019/0315325 A1* | 10/2019 | Yun | B60T 17/221 |
| 2020/0156624 A1* | 5/2020 | Witte | G05D 1/0088 |
| 2020/0384963 A1* | 12/2020 | Mellings | B60T 8/327 |
| 2020/0384966 A1* | 12/2020 | Ito | B60T 8/172 |
| 2020/0406879 A1* | 12/2020 | Hecker | B60T 13/683 |
| 2021/0078557 A1* | 3/2021 | Kobune | B60T 13/741 |
| 2021/0094526 A1* | 4/2021 | Yamaguchi | B60Q 9/00 |
| 2021/0269001 A1* | 9/2021 | Suzuki | B60T 8/321 |
| 2021/0284121 A1* | 9/2021 | Lee | G01P 3/00 |
| 2022/0194344 A1* | 6/2022 | Tarandek | B60T 13/741 |
| 2022/0297548 A1* | 9/2022 | Oh | B60T 7/122 |

* cited by examiner

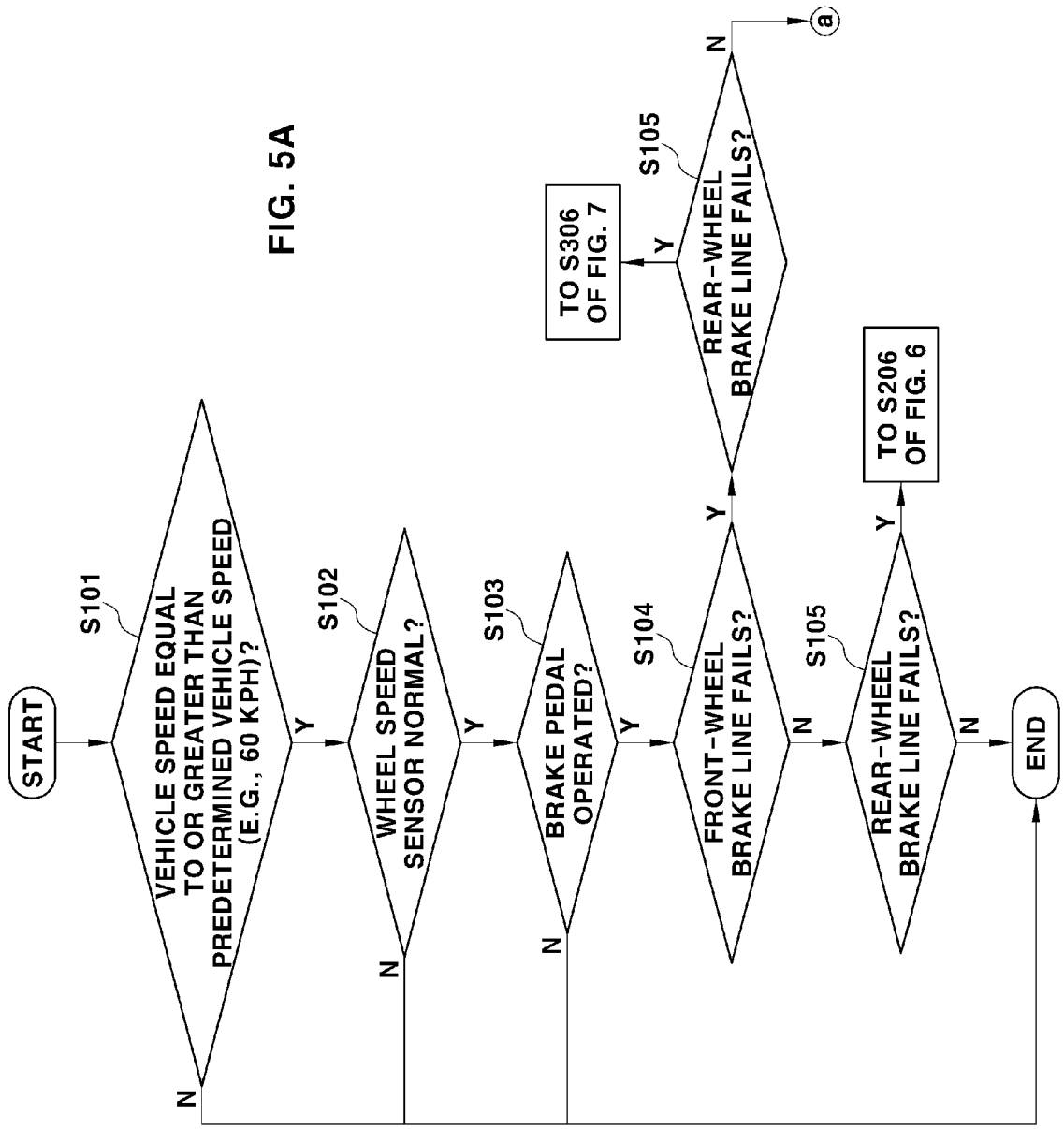

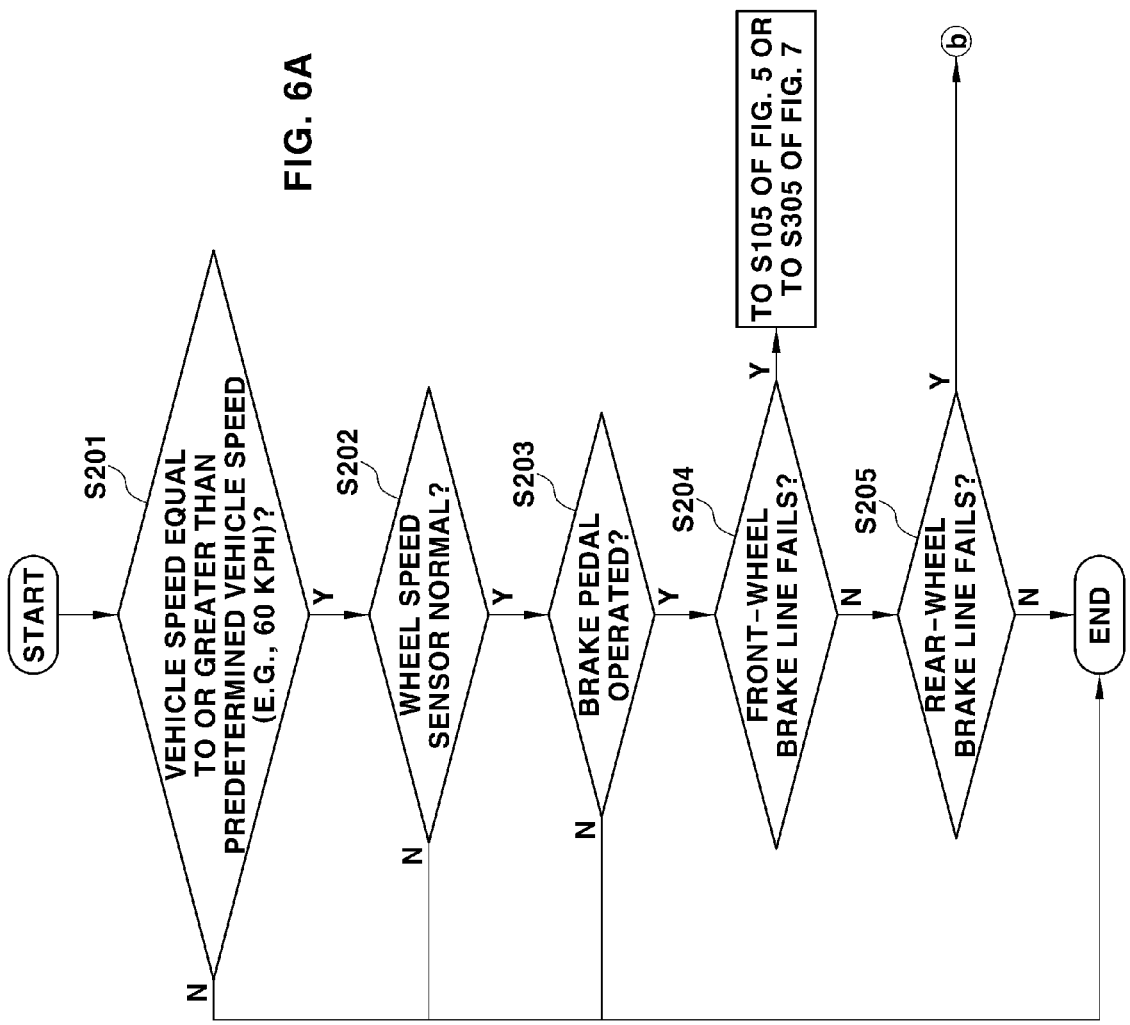

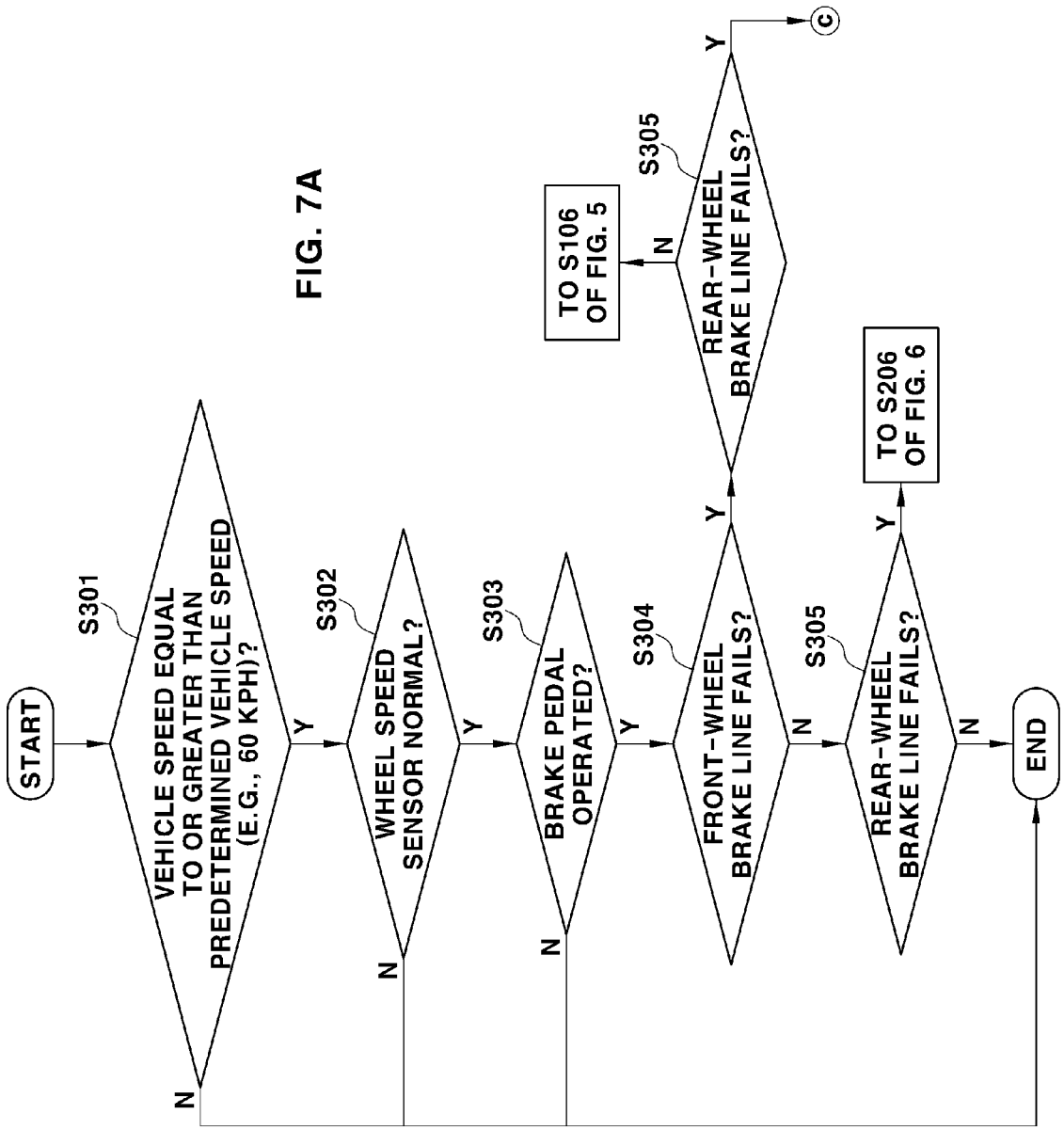

BRAKING CONTROL SYSTEM AND METHOD OF VEHICLE

CROSS-REFERENCE TO RELATED APPLICATION

This application claims under 35 U.S.C. § 119(a) the benefit of Korean Patent Application No. 10-2021-0031742 filed on Mar. 11, 2021, the entire contents of which are incorporated herein by reference.

BACKGROUND

(a) Technical Field

The present disclosure relates to a braking control system and method of a vehicle, more particularly, to the braking control system and method for safely stopping the vehicle by determining whether a brake line fails in association with manipulation of a brake pedal and by engaging an electric parking brake (EPB) when the brake line fails.

(b) Description of the Related Art

A vehicle brake line connection method uses an H-split type brake line, e.g., as shown in FIG. 1 (RELATED ART), or an X-split type brake line, e.g., as shown in FIG. 2 (RELATED ART).

In the brake line connection, even if a leak occurs in a brake hydraulic line of some systems, the brake line is divided into two systems to generate braking force using the other systems.

For example, as shown in FIG. 1, in an H-split type brake line, a first braking circuit 10 and the front-wheel brake line 12 that are used to control braking hydraulic pressure of left and right front wheels are grouped into one system, and a second braking circuit 20 and a rear-wheel brake line 22 that are used to control braking hydraulic pressure of left and right rear wheels are grouped into the other system.

In addition, as shown in FIG. 2, in the X-split type brake line, the first braking circuit 10, a left front-wheel brake line 14, and a right rear-front brake line 24, which are used to control braking hydraulic pressure of a left front wheel and a right rear wheel, are grouped into one system, and the second braking circuit 20, a right front-wheel brake line 16, and a left rear-wheel brake line 26, which are used to control braking hydraulic pressure of a right front wheel and a left rear wheel, are grouped into the other system.

In consideration of the fact that load is transferred towards the front wheels by inertia when a vehicle is braked, performance of a front wheel brake apparatus is applied higher than that of a rear wheel brake apparatus.

Accordingly, in the H-split type brake line, even if the rear-wheel brake line 22 fails (e.g., braking hydraulic pressure leak occurs), it is possible to use the front wheel brake apparatus having excellent performance, but when the front-wheel brake line 12 fails, a vehicle is braked using only the rear wheel brake apparatus having poor performance, and thus there is a problem in terms of safety due to insufficient braking force.

In contrast, in the X-split type brake line, even if the left front-wheel brake line 14 or the right rear-front brake line 24 fails or the right front-wheel brake line 16 or the left rear-wheel brake line 26 fails, it may be possible to use a left or right front wheel or a right brake apparatus, but similarly, there is a problem in terms of safety due to insufficient braking force.

As such, when brake line fails (e.g., when braking hydraulic pressure leak occurs) while a vehicle is braked or when a flow channel is blocked due to inflow of foreign substances in the brake line, braking force is weakened compared with a normal condition, and in particular, a driver is embarrassed and leads to accidents due to insufficient braking force as the brake line fails during high-speed driving, and thus there is a need for a method of compensating for braking force when the brake line fails.

SUMMARY

In one aspect, the present disclosure provides a braking control system and method of a vehicle for safely stopping the vehicle by determining whether a brake line fails via detecting a change in braking pressure and compensating for braking force through an engaging operation of an electric parking brake (EPB) when determining that the brake line fails in association with driver manipulation of the brake pedal.

An embodiment of the present disclosure provides a braking control system of a vehicle, including a vehicle speed detector configured to determine whether a current vehicle speed is equal to or greater than a predetermined vehicle speed, a wheel lock detector configured to determine whether a wheel lock occurs, a brake pedal operation detector configured to determine whether a brake pedal is operated, a brake line failure detector configured to detect whether a brake line fails when the brake pedal is operated, and a controller configured to control an electric parking brake (EPB) to be engaged when the current vehicle speed is equal to or greater than the predetermined vehicle speed, a current state is a wheel-unlock state, and the brake line failure detector detects that the brake line fails.

The vehicle speed detector may be employed as a vehicle speed sensor, the wheel lock detector may be employed as a wheel speed sensor, and the brake pedal operation detector may be employed as a brake pedal stroke sensor.

The brake line failure detector may include a first valve connected to a first braking circuit for controlling braking hydraulic pressure of left and right front wheels, a second valve connected to a second braking circuit for controlling braking hydraulic pressure of left and right rear wheels, and a pressure sensor connected to outlets of the first valve and the second valve and configured to detect braking hydraulic pressure of the first braking circuit or the second braking circuit in a state in which one of the first valve or the second valve is opened according to control of the controller.

The pressure sensor may be configured to detect the braking hydraulic pressure output from the first braking circuit in a state in which the first valve is opened and the second valve is simultaneously maintained to be closed, and may be configured to detect the braking hydraulic pressure output from the second braking circuit and to transmit the detected braking hydraulic pressure to the controller in a state in which the second valve is opened and the first valve is simultaneously maintained to be closed.

The controller may be configured to determine that a front-wheel brake line fails when the braking hydraulic pressure output from the first braking circuit is less than a set hydraulic pressure, and may be configured to control the EPB to be engaged and to block distribution of the braking hydraulic pressure of the first braking circuit and the second braking circuit.

The controller may be configured to release blocking of distribution of the braking hydraulic pressure of the second braking circuit and to then control the EPB to be completely engaged when a brake pedal stroke is equal to or greater than a reference stroke and the vehicle is decelerated and a vehicle speed is less than a reference speed after the front-wheel brake line is determined to fail and the EPB is engaged.

The controller may be configured to determine that a rear-wheel brake line fails when the braking hydraulic pressure output from the second braking circuit is less than a set hydraulic pressure, and may be configured to control the EPB to be engaged and to block distribution of the braking hydraulic pressure of the second braking circuit.

The controller may be configured to control the EPB to be engaged when a brake pedal stroke is equal to or greater than a reference stroke and the vehicle is decelerated and a vehicle speed is less than a reference speed after the rear-wheel brake line fails and the EPB is engaged.

The controller may be configured to determine that both the front-wheel brake line and the rear-wheel brake line fail and to control the EPB to be immediately engaged when the braking hydraulic pressure output from the first braking circuit and the braking hydraulic pressure output from the second braking circuit are less than a set hydraulic pressure.

The controller may control the EPB to be completely engaged when a brake pedal stroke is equal to or greater than a reference stroke and the vehicle is decelerated and a vehicle speed is less than a reference speed after both a front-wheel brake line and a rear-wheel brake line fail and the EPB is engaged.

Another embodiment of the present disclosure provides a braking control method of a vehicle, including determining, by a vehicle speed detector, whether a current vehicle speed is equal to or greater than a predetermined vehicle speed, determining, by a wheel lock detector, whether a wheel lock occurs, detecting, by a brake pedal operation detector, whether a brake pedal is operated, determining, by a brake line failure detector, whether a brake line fails when the brake pedal is operated, and controlling, by a controller, an electric parking brake (EPB) to be engaged when the current vehicle speed is equal to or greater than the predetermined vehicle speed, a current state is a wheel-unlock state, and the brake line failure detector detects that the brake line fails.

The determining whether the brake line fails may include detecting braking hydraulic pressure output from a first braking circuit in a state in which a first valve connected to the first braking circuit is opened and a second valve connected to a second braking circuit is simultaneously maintained to be closed, and detecting braking hydraulic pressure output from the second braking circuit in a state in which the second valve connected to the second braking circuit is opened and the first valve connected to the first braking circuit is simultaneously maintained to be closed.

When the braking hydraulic pressure output from the first braking circuit is less than a set hydraulic pressure, the controller may determine that a front-wheel brake line fails and may control the EPB to be engaged and may block distribution of the braking hydraulic pressure of the first braking circuit and the second braking circuit.

After the front-wheel brake line is determined to fail and the EPB is engaged, when a deceleration is equal to or greater than a reference value in a state in which a brake pedal stroke is equal to or greater than a reference stroke, the controller may determine a current point as a limit of generating braking force based on engaging of the EPB, and when a vehicle speed is less than a reference speed, the controller may release blocking of distribution of the braking hydraulic pressure of the second braking circuit and may then control the EPB to be completely engaged.

The controller may determine that a rear-wheel brake line fails when the braking hydraulic pressure output from the second braking circuit is less than a set hydraulic pressure and may control the EPB to be engaged and may block distribution of the braking hydraulic pressure of the second braking circuit.

After the rear-wheel brake line fails and the EPB is engaged, when a deceleration is equal to or greater than a reference value in a state in which a brake pedal stroke is equal to or greater than a reference stroke, the controller may determine a current point as a limit of generating braking force based on engaging of the EPB, and when a vehicle speed is less than a reference speed, the controller may control the EPB to be completely engaged.

The controller may determine that both a front-wheel brake line and a rear-wheel brake line fail when both the braking hydraulic pressure output from the first braking circuit and the braking hydraulic pressure output from the second braking circuit are less than a set hydraulic pressure, and may control the EPB to be immediately engaged.

After both the front-wheel brake line and the rear-wheel brake line are determined to fail and the EPB is engaged, when a deceleration is equal to or greater than a reference value in a state in which a brake pedal stroke is equal to or greater than a reference stroke, the controller may determine a current point as a limit of generating braking force based on engaging of the EPB, and when a vehicle speed is less than a reference speed, the controller may control the EPB to be completely engaged.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIGS. 5A-5B are flowcharts of a braking control method of a vehicle according to an embodiment of the present disclosure;

FIGS. 6A-6B are flowcharts of a braking control method of a vehicle according to another embodiment of the present disclosure; and FIGS. 7A-7B are flowcharts of a braking control method of a vehicle according to another embodiment of the present disclosure.

DETAILED DESCRIPTION

Figure 1:
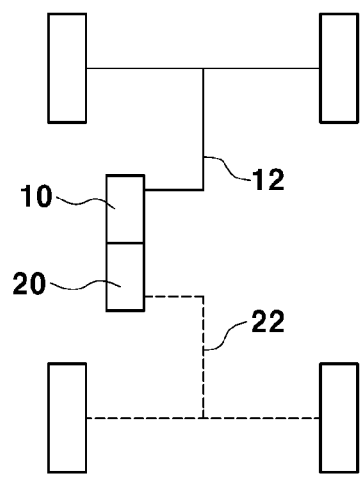
FIG. 1 (RELATED ART) is a schematic diagram showing an exemplary H-split type brake line.
Figure 2:
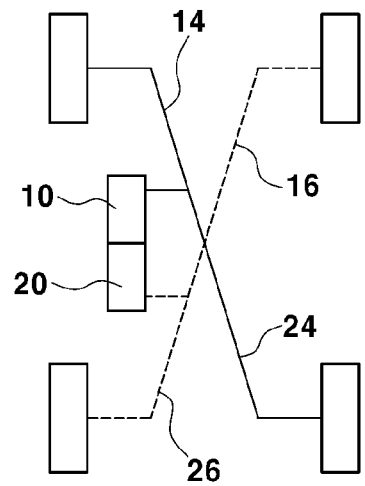
FIG. 2 (RELATED ART) is a schematic diagram showing an exemplary X-split type brake line.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

The present disclosure provides a braking control system and method for safely braking a vehicle when a brake line fails by determining whether a braking line fails via detecting a change in braking pressure and then compensating for braking force through an automatic engaging operation of an electric parking brake (EPB) without manipulation of a switch for operating the EPB in association with driver manipulation of a brake pedal.

Figure 3:
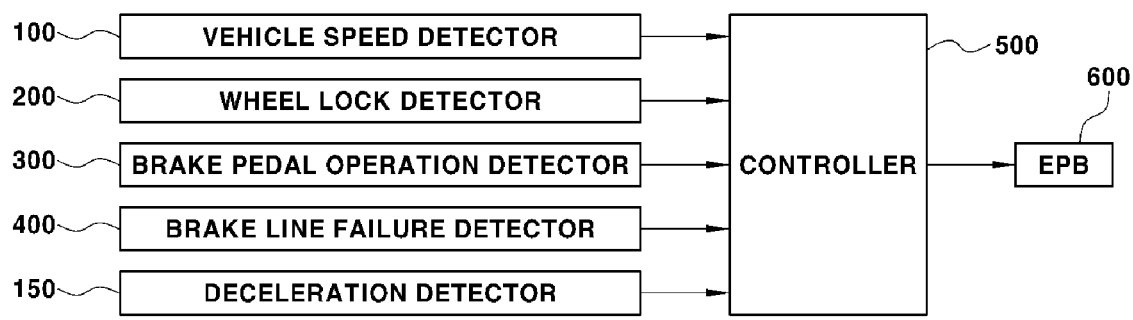
FIG. 3 is a diagram showing the configuration of a braking control system of a vehicle according to the present disclosure.

To this end, as shown in FIG. 3, a braking control system according to the present disclosure may include a vehicle speed detector 100 for determining whether a current vehicle speed is equal to or greater than a predetermined vehicle speed or is less than the predetermined vehicle speed, a wheel lock detector 200 for determining whether a wheel lock occurs, a brake pedal operation detector 300 for determining whether a brake pedal is operated, a brake line failure detector 400 for determining whether a brake line fails when the brake pedal is operated, and a controller 500 for controlling the EPB 600 to be engaged when the current vehicle speed is equal to or greater than the predetermined vehicle speed, the current state is a wheel-unlock state, and the brake line failure detector detects failure of the brake line.

The vehicle speed detector 100 may be used to determine the current vehicle speed, and because it is possible to sufficiently brake a vehicle even if braking force is not compensated for via an engaging operation of the EPB in a section in which the vehicle is stopped and travels at low speed, the vehicle speed detector 100 may be employed as a vehicle speed sensor for detecting whether the current vehicle speed is less than a low speed (e.g., less than 60 kph) in order to prevent a sense of unfamiliarity due to unnecessary intervention of the EPB.

The wheel lock detector 200 may be employed as a wheel speed sensor for detecting whether a wheel is locked and may determine that the current state is a wheel-unlock state in which a wheel rotates when a signal of the wheel speed sensor is normally output in consideration of skidding in which accidents occur when braking force is generated via an EPB engaging operation in the state in which a wheel is locked.

The brake pedal operation detector 300 may be employed as a brake pedal stroke sensor for detecting a stroke level (a depression degree) of a brake pedal depending on required deceleration of a driver and determining whether the brake pedal is operated in order to determine driver braking intention.

Figure 4:
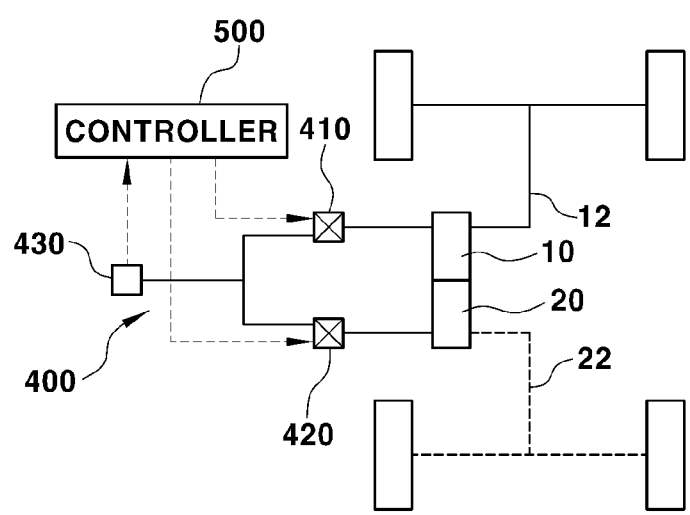
FIG. 4 is a diagram showing the configuration of a brake line failure detector of the configuration of a braking control system of a vehicle according to the present disclosure.

As shown in FIG. 4, the brake line failure detector 400 may include a first valve 410 connected to the first braking circuit 10 for controlling braking hydraulic pressure of left and right front wheels, a second valve 420 connected to the second braking circuit 20 for controlling braking hydraulic pressure of left and right rear wheels, and a pressure sensor 430 connected to outlets of the first valve 410 and the second valve 420 and configured to detect braking hydraulic pressure of the first braking circuit 10 or the second braking circuit 20 in the state in which one of the first valve 410 or the second valve 420 is opened according to control of the controller 500.

In this case, the first valve 410 and the second valve 420 may be a solenoid valve that is opened according to a current control signal of a controller.

The pressure sensor 430 may be configured to detect the braking hydraulic pressure output from the first braking circuit 10 and to transmit the same to the controller 500 in the state in which the first valve 410 is opened and the second valve 420 is simultaneously maintained to be closed, and the pressure sensor 430 may be configured to detect the braking hydraulic pressure output from the second braking circuit 20 and to transmit the same to the controller 500 in the state in which the second valve 420 is opened and the first valve 410 is simultaneously maintained to be closed.

For reference, the first braking circuit 10 and the second braking circuit 20 may be an electronic stability control (ESC) control unit for distributing and controlling braking force for each wheel in order to control a posture of a vehicle body.

When the current vehicle speed provided from the vehicle speed detector 100 is equal to or greater than a predetermined vehicle speed (e.g., 60 kph), the controller 500 may receive a signal (e.g., a normal output signal of a wheel speed sensor) provided from the wheel lock detector 200 and may determine that the current state is a wheel-unlock state, and in the state in which the controller 500 receives a signal (e.g., a brake pedal stroke sensor signal) of the brake pedal operation detector 300, upon receiving a failure detection signal from the brake line failure detector 400, the controller 500 may be configured to execute control to engage the EPB 600 and to execute control to completely engage the EPB 600.

For reference, the EPB may refer to an electronic parking brake for maintaining a parking and stop state of a vehicle through an operation based on driver manipulation of an EPB operating switch or an automatic operation to prevent a vehicle from being pushed down when the vehicle stops on a slope, etc., the state in which the EPB is engaged may refer to the state in which the EPB is operated to decelerate the vehicle while traveling and to stop the vehicle, and the state in which the EPB is completely engaged may refer to the state in which the EPB is operated to stop and then park the vehicle.

According to a first embodiment, when the braking hydraulic pressure output from the first braking circuit 10, that is, the braking hydraulic pressure output from the first braking circuit 10 and detected by the pressure sensor 430, is less than a set hydraulic pressure in the state in which the first valve 410 is opened and the second valve 420 is simultaneously maintained to be closed, the controller 500 may determine that front-wheel brake line fails and may perform control to block distribution the braking hydraulic pressure of the first braking circuit 10 and the second braking circuit 20 and to simultaneously engage the EPB 600.

In this case, distribution of the braking hydraulic pressure of the first braking circuit 10 may be blocked in order to prevent brake fluid from leaking, and distribution of the braking hydraulic pressure of the second braking circuit 20 may be blocked in order to prevent conflict between braking hydraulic pressure of a rear wheel and braking force of the EPB.

Thus, when the front-wheel brake line fails, the vehicle may be induced to be decelerated and stopped by compensating for braking force based on an automatic engaging operation of the EPB 600.

In particular, the controller 500 may be configured to perform control to decelerate the vehicle in order to stop the vehicle by compensating for braking force based on an engaging operation of the EPB 600 when the front-wheel brake line fails and to then completely engage the EPB 600 when the current vehicle speed is less than a reference speed.

To this end, according to the first embodiment, after the front-wheel brake line is determined to fail and the EPB 600 is engaged, the controller 500 may determine whether the brake pedal stroke provided by the brake pedal operation detector 300 is equal to or greater than a reference stroke (e.g., 30%) and whether deceleration provided by a deceleration detector 150 (e.g., a G sensor) is equal to or greater than a reference value (e.g., 0.4 g), may then determine that the vehicle is capable of being stopped when the vehicle speed provided by the vehicle speed detector 100 is less than a reference speed (e.g., 5 kph), may release blocking of distribution of the braking hydraulic pressure of the second braking circuit 20, and may then perform control to completely engage the EPB 600, and accordingly, the current state may become the state in which the vehicle is safely stopped and parked even on a slope, etc.

More specifically, in the state in which the brake pedal stroke provided by the brake pedal operation detector 300 is equal to or greater than a reference stroke (e.g., 30%), when the deceleration provided by the deceleration detector 150 (e.g., a G sensor) is equal to or greater than a reference value (e.g., 0.4 g), the controller 500 may determine this point as a limit of generating braking force based on engaging of the EPB, and when the vehicle speed provided by the vehicle speed detector 100 is less than a reference speed (e.g., 5 kph), the controller 500 may determine that the vehicle is capable of being stopped, may release blocking of distribution of the braking hydraulic pressure of the second braking circuit 20, and may then perform control to completely engage the EPB 600, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.4 g), the EPB may be disengaged in order to prevent skidding due to excessive braking torque applied to a rear wheel.

To this end, according to the first embodiment, in the state in which the deceleration provided by the deceleration detector 150 is equal to or greater than a reference value (e.g., 0.4 g), when the vehicle speed provided by the vehicle speed detector 100 is equal to or greater than a reference value (e.g., 5 kph), the controller 500 may further perform control to disengage the EPB based on a detection signal of a wheel speed sensor employed as the wheel lock detector 200 as described below.

According to a second embodiment, when the braking hydraulic pressure output from the second braking circuit 20, that is, the braking hydraulic pressure output from the second braking circuit 20 and detected by the pressure sensor 430 is less than a set hydraulic pressure in the state in which the second valve 420 is opened and the first valve 410 is simultaneously maintained to be closed, the controller 500 may determine rear-wheel brake line fails and may perform control to block distribution of the braking hydraulic pressure of the second braking circuit 20 and to simultaneously engage the EPB 600.

In this case, braking hydraulic pressure may be normally provided to a front wheel via distribution of the braking hydraulic pressure of the first braking circuit 10 and distribution of the braking hydraulic pressure of the second braking circuit 20 is blocked in order to prevent conflict between braking hydraulic pressure of a rear wheel and braking force of the EPB.

Thus, when the rear-wheel brake line fails, the vehicle may be easily decelerated and stopped by compensating for braking force of the rear wheel based on the braking hydraulic pressure of the front wheel and the automatic engaging operation of the EPB 600.

In particular, the controller 500 may be configured to perform control to decelerate the vehicle in order to stop the vehicle by compensating for braking force based on an engaging operation of the EPB 600 when the rear-wheel brake line fails and to then completely engage the EPB 600 when the current vehicle speed is less than a reference speed.

To this end, according to the second embodiment, after the rear-wheel brake line is determined to fail and the EPB 600 is engaged, the controller 500 may determine whether the brake pedal stroke provided by the brake pedal operation detector 300 is equal to or greater than a reference stroke (e.g., 30%) and whether deceleration provided by the deceleration detector 150 (e.g., a G sensor) is equal to or greater than a reference value (e.g., 0.6 g), may then determine that the vehicle is capable of being stopped when the vehicle speed provided by the vehicle speed detector is less than a reference speed (e.g., 5 kph), and may perform control to completely engage the EPB 600, and accordingly, the current state may become the state in which the vehicle is safely stopped and parked even on a slope, etc.

In particular, in the state in which the brake pedal stroke provided by the brake pedal operation detector 300 is equal to or greater than a reference stroke (e.g., 30%), when the deceleration provided by the deceleration detector 150 (e.g., a G sensor) is equal to or greater than a reference value (e.g., 0.6 g), the controller 500 may determine this point as a limit of generating braking force based on engaging of the EPB, and when the vehicle speed provided by the vehicle speed detector 100 is less than a reference speed (e.g., 5 kph), the controller 500 may determine that the vehicle is capable of being stopped, and may perform control to completely engage the EPB 600, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.6 g), the EPB may be disengaged in order to prevent skidding due to excessive braking torque applied to a rear wheel.

To this end, according to the second embodiment, in the state in which the deceleration provided by the deceleration detector 150 is equal to or greater than a reference value (e.g., 0.6 g), when the vehicle speed provided by the vehicle speed detector is equal to or greater than a reference value (e.g., 5 kph), the controller 500 may further perform control to disengage the EPB based on a detection signal of a wheel speed sensor employed as the wheel lock detector 200 as described below.

According to a third embodiment, when the braking hydraulic pressure output from the first braking circuit 10 and detected by the pressure sensor 430 is less than a set hydraulic pressure in the state in which the first valve 410 is opened and the second valve 420 is simultaneously maintained to be closed and the braking hydraulic pressure output from the second braking circuit 20 and detected by the pressure sensor 430 is less than a set hydraulic pressure in the state in which the second valve 420 is opened and the first valve 410 is simultaneously maintained to be closed, the controller 500 may determine that both front-wheel brake line and rear-wheel brake line fail and may perform control to immediately engage the EPB 600.

Thus, when the front-wheel brake line and the rear-wheel brake line fail, the vehicle may be easily decelerated and stopped by compensating for braking force based on the automatic engaging operation of the EPB 600.

In detail, according to the third embodiment, the controller 500 may be configured to perform control to decelerate the vehicle in order to stop the vehicle by compensating for braking force based on an engaging operation of the EPB 600 when the front-wheel brake line and the rear-wheel brake line fail and to then completely engage the EPB 600 when the current vehicle speed is less than a reference speed.

To this end, according to the third embodiment, after both the front-wheel brake line and the rear-wheel brake line are determined to fail, the controller 500 may determine whether the brake pedal stroke provided by the brake pedal operation detector 300 is equal to or greater than a reference stroke (e.g., 30%) and whether deceleration provided by the deceleration detector 150 (e.g., a G sensor) is equal to or greater than a reference value (e.g., 0.4 g), may then determine that the vehicle is capable of being stopped when the vehicle speed provided by the vehicle speed detector is less than a reference speed (e.g., 5 kph), and may perform control to completely engage the EPB 600, and accordingly, the current state may become the state in which the vehicle is safely stopped and parked even on a slope, etc.

More specifically, in the state in which the brake pedal stroke provided by the brake pedal operation detector 300 is equal to or greater than a reference stroke (e.g., 30%), when the deceleration provided by the deceleration detector 150 (e.g., a G sensor) is equal to or greater than a reference value (e.g., 0.4 g), the controller 500 may determine this point as a limit of generating braking force based on engaging of the EPB, and when the vehicle speed provided by the vehicle speed detector 100 is less than a reference speed (e.g., 5 kph), the controller 500 may determine that the vehicle is capable of being stopped, and may perform control to completely engage the EPB 600, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.4 g), the EPB may be disengaged in order to prevent skidding due to excessive braking torque applied to a rear wheel.

To this end, according to the third embodiment, in the state in which the deceleration provided by the deceleration detector 150 is equal to or greater than a reference value (e.g., 0.4 g), when the vehicle speed provided by the vehicle speed detector is equal to or greater than a reference value (e.g., 5 kph), the controller 500 may further perform control to disengage the EPB based on a detection signal of a wheel speed sensor employed as the wheel lock detector 200 as described below.

Here, a braking control method according to the present disclosure based on the above configuration will be described in detail with regard to embodiments.

First Embodiment

Figure 5B:
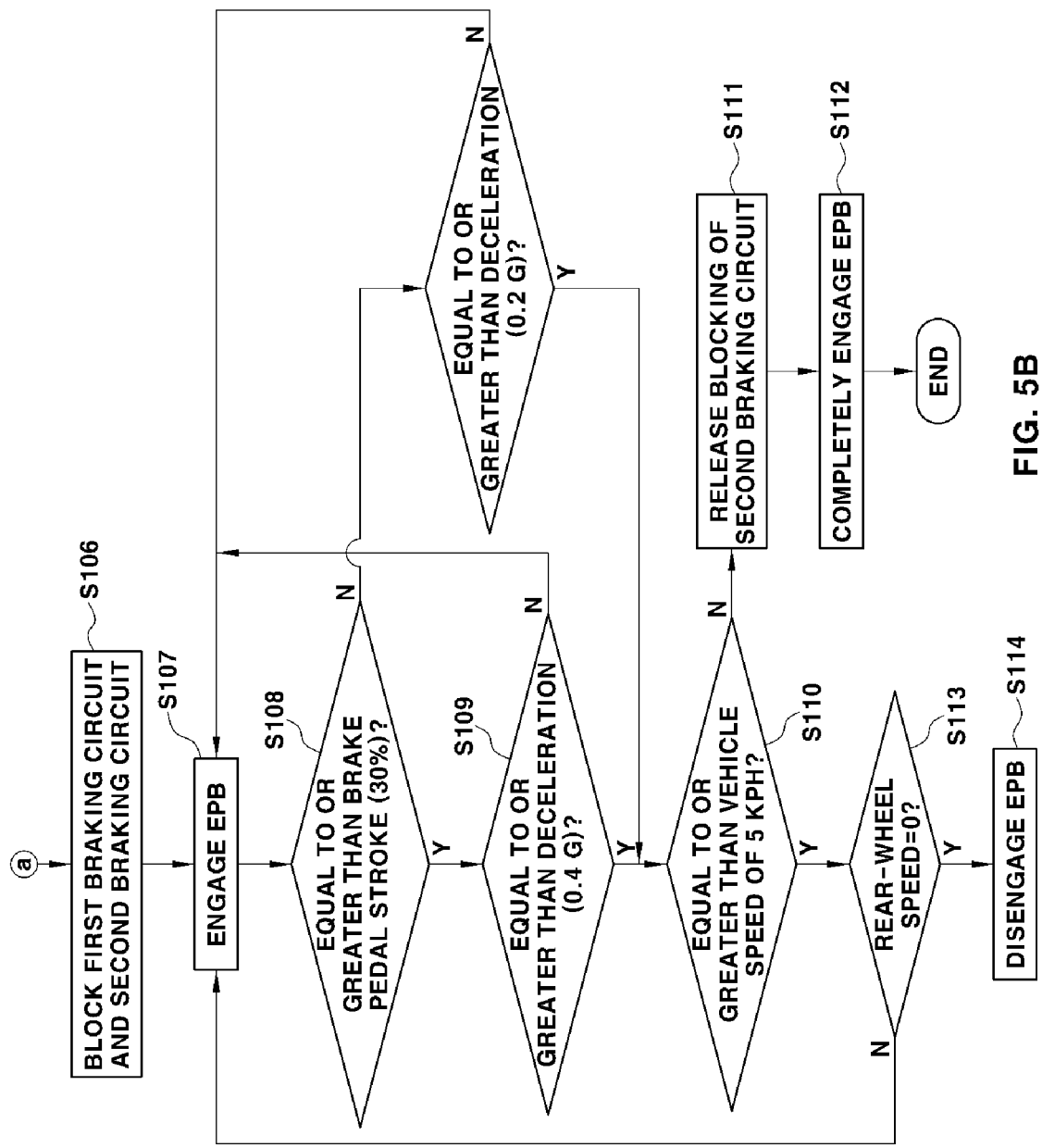

FIGS. 5A-5B are flowcharts of a braking control method when front-wheel brake line fails according to a first embodiment of the present disclosure.

First, whether the current vehicle speed detected by the vehicle speed detector 100 is equal to or greater than a predetermined vehicle speed may be determined (S101).

That is, when a vehicle speed sensor employed as the vehicle speed detector 100 may detect the current vehicle speed and provides the same to the controller 500, the controller 500 may check whether the current vehicle speed is equal to or greater than the predetermined vehicle speed (e.g., 60 kph).

The wheel lock detector 200 may detect whether a wheel is locked (S102).

That is, upon receiving the detection signal from the wheel speed sensor employed as the wheel lock detector 200, the controller 500 may determine the current state to be a wheel-unlock state indicating that a wheel rotates.

The brake pedal operation detector 300 may detect whether a brake pedal is operated (S103).

That is, when the brake pedal stroke sensor employed as the brake pedal operation detector 300 transmits a stroke detection signal to the controller 500, the controller 500 may determine that the brake pedal is operated by a driver.

Then, an operation of determining whether the brake line fails may proceed.

The operation of determining whether the brake line fails may be performed by the brake line failure detector 400 and the controller 500 and may include operation S104 of determining whether the front-wheel brake line fails, and operation S105 of determining whether the rear-wheel brake line fails.

In particular, the operation of determining whether the brake line fails may include an operation in which the pressure sensor 430 detects the braking hydraulic pressure output from the first braking circuit 10 and transmits the same to the controller 500 according to control of the controller 500 in the state in which the first valve 410 connected to the first braking circuit 10 is opened and the second valve 420 connected to the second braking circuit is simultaneously maintained to be closed, and an operation in which the pressure sensor 430 detects the braking hydraulic pressure output from the second braking circuit 20 and transmits the same to the controller 500 according to control of the controller 500 in the state in which the second valve 420 connected to the second braking circuit 20 is opened and the first valve 410 connected to the first braking circuit 10 is simultaneously maintained to be closed.

Then, the controller 500 may compare the braking hydraulic pressure output from the first braking circuit 10 with a set hydraulic pressure and may compare the braking hydraulic pressure output from the second braking circuit 20 with the set hydraulic pressure.

As the comparison result, when the braking hydraulic pressure output from the first braking circuit 10 is less than the set hydraulic pressure and the braking hydraulic pressure output from the second braking circuit 20 is maintained to be the set hydraulic pressure, the controller 500 may determine that only the front-wheel brake line fails.

Then, when determining that the current vehicle speed is a predetermined vehicle speed (e.g., 60 kph), the current state is a wheel-unlock state, and only the front-wheel brake line fails based on a detection operation of the brake line failure detector 400, the controller 500 may perform control (S106) to block distribution of the braking hydraulic pressure of the first braking circuit 10 and the second braking circuit 20 and may perform control (S107) to engage the EPB 600.

In this case, distribution of the braking hydraulic pressure of the first braking circuit 10 may be blocked in order to prevent a brake fluid from leaking, and distribution of the braking hydraulic pressure of the second braking circuit 20 may be blocked in order to prevent conflict between braking hydraulic pressure of a rear wheel and braking force of the EPB.

Thus, when the front-wheel brake line fails, the vehicle may be easily induced to be decelerated and stopped by compensating for braking force based on an automatic engaging operation of the EPB 600.

As described above, when the front-wheel brake line fails, if the vehicle is decelerated and then a vehicle speed is less than a reference speed by compensating for braking force based on an engaging operation of the EPB 600, control to completely engage the EPB 600 may be further performed, and thus the vehicle may be stopped.

To this end, after the front-wheel brake line is determined to fail and the EPB 600 is engaged, the controller 500 may determine whether the brake pedal stroke provided by the brake pedal operation detector 300 is equal to or greater than a reference stroke (e.g., 30%) (S108), may determine whether deceleration provided by a deceleration detector 150 (e.g., a G sensor) is equal to or greater than a reference value (e.g., 0.4 g) (S109), and may determine whether the vehicle speed provided by the vehicle speed detector is less than a reference speed (e.g., 5 kph) (S110).

As the determination result, in the state in which the brake pedal stroke is equal to or greater than a reference stroke (e.g., 30%), when the deceleration provided by the deceleration detector 150 (e.g., a G sensor) is equal to or greater than a reference value (e.g., 0.4 g), this point may be determined to be a limit of generating braking force based on engaging of the EPB, and when the vehicle speed provided by the vehicle speed detector 100 is less than a reference speed (e.g., 5 kph), the vehicle may be determined to be capable of being stopped, and the controller 500 may perform control (S111) to release blocking of distribution of the braking hydraulic pressure of the second braking circuit 20 and may then perform control (S112) to completely engage the EPB 600 (S112).

Thus, as distribution of the braking hydraulic pressure of the second braking circuit 20 is released, the current state becomes the state in which the second braking circuit 20 is capable of distributing braking force to a rear wheel and the EPB 600 may be completely engaged, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.4 g), the EPB may be disengaged in order to prevent skidding due to excessive braking torque applied to a rear wheel.

To this end, in the state in which the deceleration provided by the deceleration detector 150 is equal to or greater than a reference value (e.g., 0.4 g), when the vehicle speed provided by the vehicle speed detector 100 is equal to or greater than a reference value (e.g., 5 kph), the controller 500 may check a detection signal of a wheel speed sensor employed as the wheel lock detector 200 and may determine whether a wheel speed of a rear wheel is zero (S113).

As the determination result, when the detection signal of the wheel speed sensor is continuously received, the rear-wheel speed may not be determined to be zero, and while the EPB is maintained to be engaged, the above operations S107 to S110 for decelerating and stopping the vehicle may be repeatedly performed.

In contrast, when the detection signal of the wheel speed sensor is not received, the current state may be determined to be the state in which the rear-wheel speed is zero (the state in which a rear wheel is locked), and skidding in which accidents occur when braking force is generated via an EPB engaging operation in the state in which a wheel is locked may occur, and accordingly, the controller 500 may perform control to disengage the EPB (S114).

As such, in association with driver manipulation of a brake pedal, whether the front-wheel brake line fails may be determined by detecting change in braking pressure, and then the EPB may be automatically engaged without manipulation of a switch for operating the EPB, and accordingly, the vehicle may be safely stopped in rapid response to insufficient braking force due to failure of the front-wheel brake line.

Second Embodiment

Figure 6B:
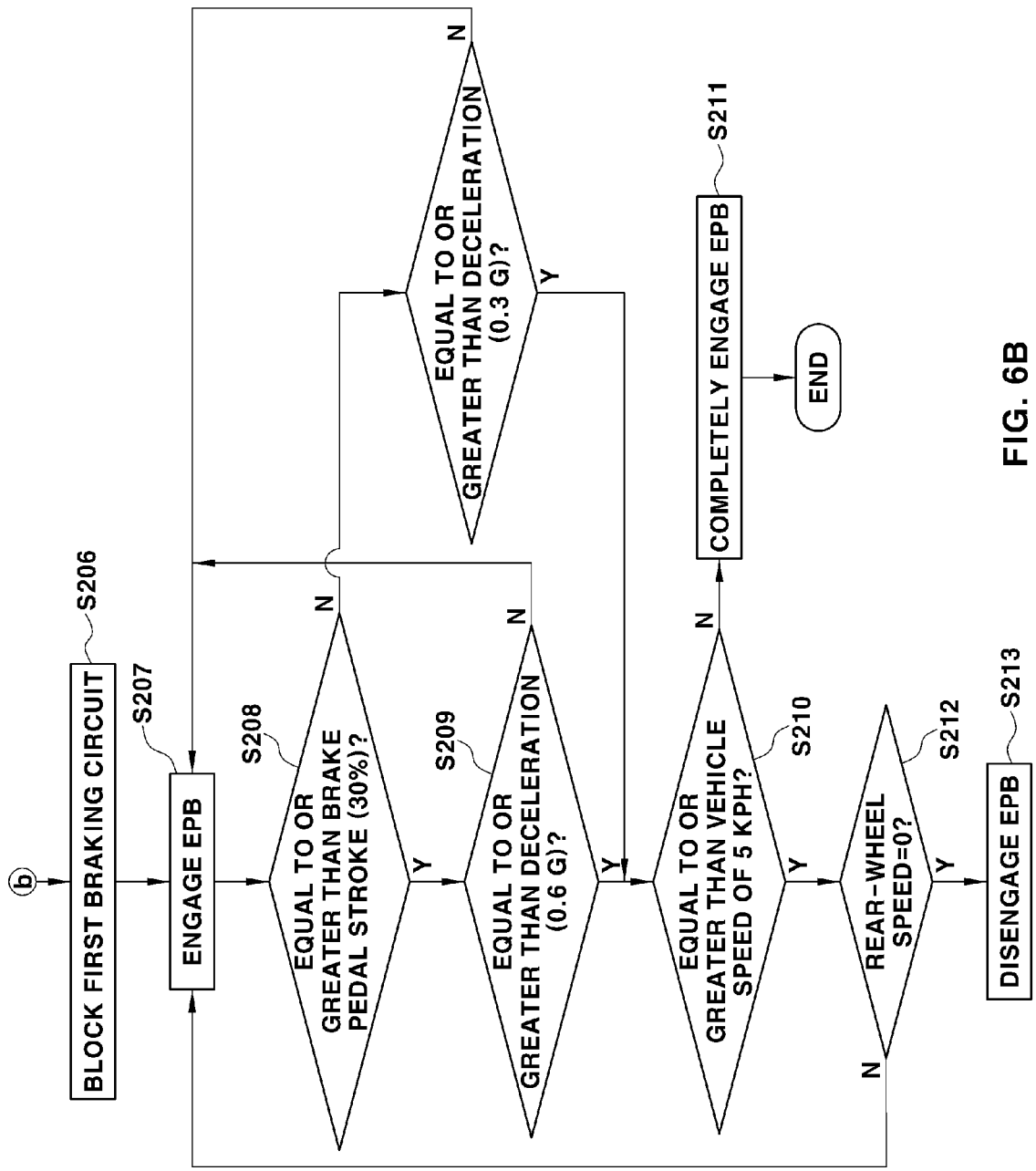

FIGS. 6A-6B are flowcharts of a braking control method when the rear-wheel brake line fails according to a second embodiment of the present disclosure.

First, whether the current vehicle speed detected by the vehicle speed detector 100 is equal to or greater than a predetermined vehicle speed may be determined (S201).

That is, when a vehicle speed sensor employed as the vehicle speed detector 100 detects the current vehicle speed and provides the same to the controller 500, the controller 500 may check whether the current vehicle speed is equal to or greater than the predetermined vehicle speed (e.g., 60 kph).

The wheel lock detector 200 may detect whether a wheel is locked (S202).

That is, upon receiving the detection signal from the wheel speed sensor employed as the wheel lock detector 200, the controller 500 may determine the current state to be a wheel-unlock state indicating that a wheel rotates.

The brake pedal operation detector 300 may detect whether a brake pedal is operated (S203).

That is, when the brake pedal stroke sensor employed as the brake pedal operation detector 300 transmits a stroke detection signal to the controller 500, the controller 500 may determine that the brake pedal is operated by a driver.

Then, an operation of determining whether the brake line has failed may proceed.

The operation of determining whether the brake line has failed may be performed by the brake line failure detector 400 and the controller 500 and may include operation S204 of determining whether the front-wheel brake line has failed, and operation S205 of determining whether the rear-wheel brake line has failed.

In more detail, the operation of determining whether the brake line has failed may include an operation in which the pressure sensor 430 detects the braking hydraulic pressure output from the first braking circuit 10 and transmits the same to the controller 500 according to control of the controller 500 in the state in which the first valve 410 connected to the first braking circuit 10 is opened and the second valve 420 connected to the second braking circuit is simultaneously maintained to be closed, and an operation in which the pressure sensor 430 detects the braking hydraulic pressure output from the second braking circuit 20 and transmits the same to the controller 500 according to control of the controller 500 in the state in which the second valve 420 connected to the second braking circuit 20 is opened and the first valve 410 connected to the first braking circuit 10 is simultaneously maintained to be closed.

Then, the controller 500 may compare the braking hydraulic pressure output from the first braking circuit 10 with a set hydraulic pressure and may compare the braking hydraulic pressure output from the second braking circuit 20 with the set hydraulic pressure.

As the comparison result, when the braking hydraulic pressure output from the first braking circuit 10 is maintained to be the set hydraulic pressure and the braking hydraulic pressure output from the second braking circuit 20 is less than the set hydraulic pressure, the controller 500 may determine that only the rear-wheel brake line has failed.

Then, upon determining that the current vehicle speed is a predetermined vehicle speed (e.g., 60 kph), the current state is a wheel-unlock state, and only the rear-wheel brake line has failed based on a detection operation of the brake line failure detector 400, the controller 500 may perform control (S206) to block distribution of the braking hydraulic pressure of the second braking circuit 20 and may perform control (S207) to engage the EPB 600.

In this case, distribution of the braking hydraulic pressure of the second braking circuit 20 may be blocked in order to prevent conflict between braking hydraulic pressure of a rear wheel and braking force of the EPB.

Thus, when the rear-wheel brake line fails, the vehicle may be easily induced to be decelerated and stopped by compensating for braking force based on an automatic engaging operation of the EPB 600.

As described above, when the rear-wheel brake line fails, if the vehicle is decelerated and then a vehicle speed is less than a reference speed by compensating for braking force based on an engaging operation of the EPB 600, control to completely engage the EPB 600 may be further performed.

To this end, after the rear-wheel brake line is determined to have failed and the EPB 600 is engaged, the controller 500 may determine whether the brake pedal stroke provided by the brake pedal operation detector 300 is equal to or greater than a reference stroke (e.g., 30%) (S208), may determine whether deceleration provided by a deceleration detector 150 (e.g., a G sensor) is equal to or greater than a reference value (e.g., 0.6 g) (S209), and may determine whether the vehicle speed provided by the vehicle speed detector 100 is less than a reference speed (e.g., 5 kph) (S210).

As the determination result, in the state in which the brake pedal stroke is equal to or greater than a reference stroke (e.g., 30%), when the deceleration provided by the deceleration detector 150 (e.g., a G sensor) is equal to or greater than a reference value (e.g., 0.6 g), this point may be determined to be a limit of generating braking force based on engaging of the EPB, and when the vehicle speed provided by the vehicle speed detector 100 is less than a reference speed (e.g., 5 kph), the vehicle may be determined to be capable of being stopped, and the controller 500 may perform control to completely engage the EPB 600 (S211).

Thus, the EPB 600 may be completely engaged, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.6 g), the EPB may be disengaged in order to prevent skidding due to excessive braking torque applied to a rear wheel.

To this end, in the state in which the deceleration provided by the deceleration detector 150 is equal to or greater than a reference value (e.g., 0.6 g), when the vehicle speed provided by the vehicle speed detector is equal to or greater than a reference value (e.g., 5 kph), the controller 500 may check a detection signal of a wheel speed sensor employed as the wheel lock detector 200 and may determine whether a wheel speed of a rear wheel is zero (S212).

As the determination result, when the detection signal of the wheel speed sensor is continuously received, the rear-wheel speed may not be determined to be zero, and while the EPB is maintained to be engaged, the above operations S207 to S210 for decelerating and stopping the vehicle may be repeatedly performed.

In contrast, when the detection signal of the wheel speed sensor is not received, the current state may be determined to be the state in which the rear-wheel speed is zero (the state in which a rear wheel is locked), and skidding in which accidents occur when braking force is generated via an EPB engaging operation in the state in which a wheel is locked may occur, and accordingly, the controller 500 may perform control to disengage the EPB (S213).

As such, in association with driver manipulation of a brake pedal, whether the rear-wheel brake line has failed may be determined by detecting change in braking pressure, and then the EPB may be automatically engaged without manipulation of a switch for operating the EPB, and accordingly, the vehicle may be safely stopped in rapid response to insufficient braking force due to failure of the rear-wheel brake line.

Third Embodiment

Figure 7B:
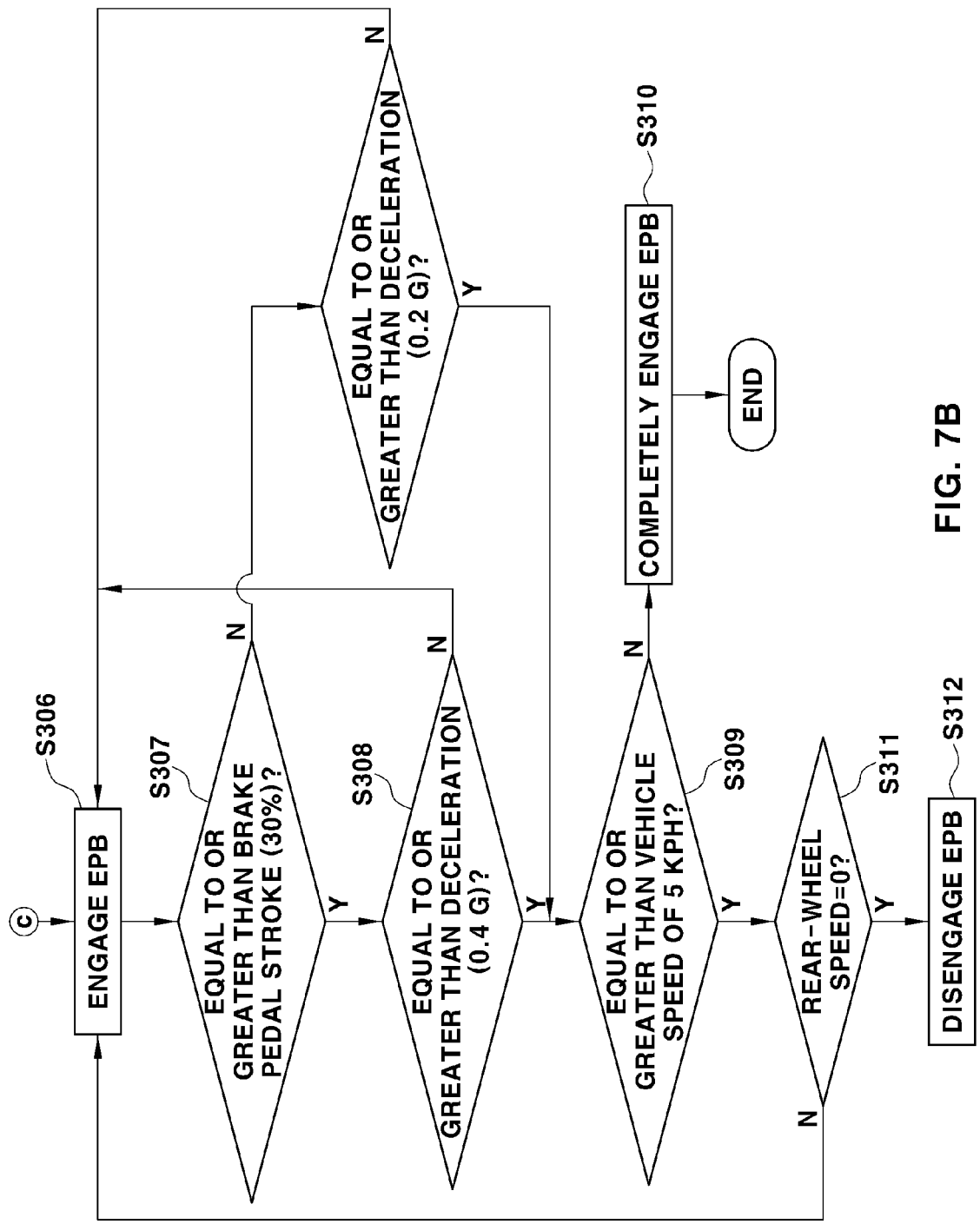

FIGS. 7A-7B are flowcharts of a braking control method when the front-wheel brake line and the rear-wheel brake line fail according to a third embodiment of the present disclosure.

First, whether the current vehicle speed detected by the vehicle speed detector 100 is equal to or greater than a predetermined vehicle speed may be determined (S301).

That is, when a vehicle speed sensor employed as the vehicle speed detector 100 detects the current vehicle speed and provides the same to the controller 500, the controller

500 may check whether the current vehicle speed is equal to or greater than the predetermined vehicle speed (e.g., 60 kph).

The wheel lock detector 200 may detect whether a wheel is locked (S302).

That is, upon receiving the detection signal from the wheel speed sensor employed as the wheel lock detector 200, the controller 500 may determine the current state to be a wheel-unlock state indicating that a wheel rotates.

The brake pedal operation detector 300 may detect whether a brake pedal is operated (S303).

That is, when the brake pedal stroke sensor employed as the brake pedal operation detector 300 transmits a stroke detection signal to the controller 500, the controller 500 may determine that the brake pedal is operated by a driver.

Then, an operation of determining whether the brake line has failed may proceed.

The operation of determining whether the brake line fails may be performed by the brake line failure detector 400 and the controller 500 and may include operation S304 of determining whether the front-wheel brake line has failed, and operation S305 of determining whether the rear-wheel brake line has failed.

In particular, the operation of determining whether the brake line has failed may include an operation in which the pressure sensor 430 detects the braking hydraulic pressure output from the first braking circuit 10 and transmits the same to the controller 500 according to control of the controller 500 in the state in which the first valve 410 connected to the first braking circuit 10 is opened and the second valve 420 connected to the second braking circuit is simultaneously maintained to be closed, and an operation in which the pressure sensor 430 detects the braking hydraulic pressure output from the second braking circuit 20 and transmits the same to the controller 500 according to control of the controller 500 in the state in which the second valve 420 connected to the second braking circuit 20 is opened and the first valve 410 connected to the first braking circuit 10 are simultaneously maintained to be closed.

Then, the controller 500 may compare the braking hydraulic pressure output from the first braking circuit 10 with a set hydraulic pressure and may compare the braking hydraulic pressure output from the second braking circuit 20 with the set hydraulic pressure.

As the comparison result, when the braking hydraulic pressure output from the first braking circuit 10 is less than the set hydraulic pressure and the braking hydraulic pressure output from the second braking circuit 20 is also less than the set hydraulic pressure, the controller 500 may determine that both the front-wheel brake line and the rear-wheel brake line have failed.

Then, when determining that the current vehicle speed is a predetermined vehicle speed (e.g., 60 kph), the current state is a wheel-unlock state, and both the front-wheel brake line and the rear-wheel brake line fail based on a detection operation of the brake line failure detector 400, the controller 500 may perform control to immediately engage the EPB 600 (S306).

Thus, when both the front-wheel brake line and the rear-wheel brake line have failed, the vehicle may be easily induced to be decelerated and stopped by compensating for braking force based on an automatic engaging operation of the EPB 600.

As described above, when both the front-wheel brake line and the rear-wheel brake line have failed, if the vehicle is decelerated and then a vehicle speed is less than a reference speed by compensating for braking force based on an engaging operation of the EPB 600, control to completely engage the EPB 600 may be further performed.

To this end, after both the front-wheel brake line and the rear-wheel brake line are determined to have failed and the EPB 600 is engaged, the controller 500 may determine whether the brake pedal stroke provided by the brake pedal operation detector 300 is equal to or greater than a reference stroke (e.g., 30%) (S307), may determine whether deceleration provided by a deceleration detector 150 (e.g., a G sensor) is equal to or greater than a reference value (e.g., 0.4 g) (S308), and may determine whether the vehicle speed provided by the vehicle speed detector is less than a reference speed (e.g., 5 kph) (S309).

As the determination result, in the state in which the brake pedal stroke is equal to or greater than a reference stroke (e.g., 30%), when the deceleration provided by the deceleration detector 150 (e.g., a G sensor) is equal to or greater than a reference value (e.g., 0.4 g), this point may be determined to be a limit of generating braking force based on engaging of the EPB, and when the vehicle speed provided by the vehicle speed detector 100 is less than a reference speed (e.g., 5 kph), the vehicle may be determined to be capable of being stopped, and the controller 500 may perform control to completely engage the EPB 600 (S310).

Thus, the EPB 600 may be completely engaged, and accordingly, the current state may become the state in which the vehicle is safely stopped and parked even on a slope, etc.

In this case, when the deceleration provided by the deceleration detector 150 reaches a target deceleration equal to or greater than a reference value (e.g., 0.4 g), the EPB may be disengaged in order to prevent skidding due to excessive braking torque applied to a rear wheel.

To this end, in the state in which the deceleration provided by the deceleration detector 150 is equal to or greater than a reference value (e.g., 0.6 g), when the vehicle speed provided by the vehicle speed detector 100 is equal to or greater than a reference value (e.g., 5 kph), the controller 500 may check a detection signal of a wheel speed sensor employed as the wheel lock detector 200 and may determine whether a wheel speed of a rear wheel is zero (S311).

As the determination result, when the detection signal of the wheel speed sensor is continuously received, the rear-wheel speed may not be determined to be zero, and while the EPB is maintained to be engaged, the above operations S306 to S309 for decelerating and stopping the vehicle may be repeatedly performed.

In contrast, when the detection signal of the wheel speed sensor is not received, the current state may be determined to be the state in which the rear-wheel speed is zero (the state in which a rear wheel is locked), and skidding in which accidents occur when braking force is generated via an EPB engaging operation in the state in which a wheel is locked may occur, and accordingly, the controller 500 may perform control to disengage the EPB (S312).

As such, in association with driver manipulation of a brake pedal, whether the front-wheel brake line and the rear-wheel brake line fail may be determined by detecting change in braking pressure, and then the EPB may be automatically engaged without manipulation of a switch for operating the EPB, and accordingly, the vehicle may be safely stopped in rapid response to insufficient braking force due to failure of the front-wheel brake line and the rear-wheel brake line.

As described herein, the present disclosure may have the following advantages.

First, when the brake line is determined to have failed, the vehicle may be safely stopped to prevent accidents by compensating for braking force based on an engaging operation of the EPB.

Second, in association with driver manipulation of a brake pedal, whether the brake line has failed may be determined by detecting change in braking pressure, and then the EPB may be automatically engaged without manipulation of a switch for operating the EPB, and accordingly, the vehicle may be safely stopped in rapid response to insufficient braking force due to failure of the brake line.

The invention has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A braking control system of a vehicle, the system comprising:
    a vehicle speed detector configured to determine whether a current vehicle speed is equal to or greater than a predetermined vehicle speed;
    a wheel lock detector configured to determine whether a wheel lock occurs;
    a brake pedal operation detector configured to determine whether a brake pedal is operated;
    a brake line failure detector configured to detect whether a brake line in the form of a hydraulic brake line fails when the brake pedal is operated; and
    a controller configured to control an electric parking brake (EPB) to be automatically engaged when the current vehicle speed is equal to or greater than the predetermined vehicle speed, a current state is a wheel-unlock state, and the brake line failure detector detects that the brake line fails;
    wherein the controller is further configured to determine that the brake line fails when a braking hydraulic pressure output from a braking circuit is less than a set hydraulic pressure, to control the EPB to be engaged, and to block distribution of the braking hydraulic pressure of the braking circuit.

2. The system of claim 1, wherein the vehicle speed detector is a vehicle speed sensor.

3. The system of claim 1, wherein the wheel lock detector is a wheel speed sensor.

4. The system of claim 1, wherein the brake pedal operation detector is a brake pedal stroke sensor.

5. The system of claim 1, wherein the braking circuit includes a first braking circuit and a second braking circuit, and the brake line includes a front-wheel brake line and a rear wheel brake line; and
    wherein the brake line failure detector comprises:
        a first valve connected to the first braking circuit for controlling braking hydraulic pressure of left and right front wheels;
        a second valve connected to the second braking circuit for controlling braking hydraulic pressure of left and right rear wheels; and
        a pressure sensor connected to outlets of the first valve and the second valve and configured to detect braking hydraulic pressure of the first braking circuit or the second braking circuit in a state in which one of the first valve or the second valve is opened according to control of the controller.

6. The system of claim 5, wherein the pressure sensor is configured to detect the braking hydraulic pressure output from the first braking circuit in a state in which the first valve is opened and the second valve is simultaneously maintained to be closed, and is configured to detect the braking hydraulic pressure output from the second braking circuit and to transmit the detected braking hydraulic pressure to the controller in a state in which the second valve is opened and the first valve is simultaneously maintained to be closed.

7. The system of claim 6, wherein the controller is configured to determine that the front-wheel brake line fails when the braking hydraulic pressure output from the first braking circuit is less than the set hydraulic pressure, and is configured to control the EPB to be engaged and to block distribution of the braking hydraulic pressure of the first braking circuit and the second braking circuit.

8. The system of claim 7, when the controller is configured to release blocking of distribution of the braking hydraulic pressure of the second braking circuit and to then control the EPB to be completely engaged when a brake pedal stroke is equal to or greater than a reference stroke and the vehicle is decelerated and a vehicle speed is less than a reference speed after the front-wheel brake line is determined to fail and the EPB is engaged.

9. The system of claim 6, wherein the controller is configured to determine that the rear-wheel brake line fails when the braking hydraulic pressure output from the second braking circuit is less than the set hydraulic pressure, and is configured to control the EPB to be engaged and to block distribution of the braking hydraulic pressure of the second braking circuit.

10. The system of claim 9, wherein the controller is configured to control the EPB to be engaged when a brake pedal stroke is equal to or greater than a reference stroke and the vehicle is decelerated and a vehicle speed is less than a reference speed after the rear-wheel brake line fails and the EPB is engaged.

11. The system of claim 6, wherein the controller is configured to determine that both the front-wheel brake line and the rear-wheel brake line fail and to control the EPB to be immediately engaged when the braking hydraulic pressure output from the first braking circuit and the braking hydraulic pressure output from the second braking circuit are less than the set hydraulic pressure.

12. The system of claim 11, wherein the controller controls the EPB to be completely engaged when a brake pedal stroke is equal to or greater than a reference stroke and the vehicle is decelerated and a vehicle speed is less than a reference speed after both the front-wheel brake line and the rear-wheel brake line fail and the EPB is engaged.

13. A braking control method of a vehicle, the method comprising:
    determining, by a vehicle speed detector, whether a current vehicle speed is equal to or greater than a predetermined vehicle speed;
    determining, by a wheel lock detector, whether a wheel lock occurs;
    detecting, by a brake pedal operation detector, whether a brake pedal is operated;
    determining, by a brake line failure detector, whether a brake line in the form of a braking hydraulic line fails when the brake pedal is operated; and
    controlling, by a controller, an electric parking brake (EPB) to be automatically engaged when the current vehicle speed is equal to or greater than the predetermined vehicle speed, a current state is a wheel-unlock state, and the brake line failure detector detects that the brake line fails;

wherein, when a braking hydraulic pressure output from a braking circuit is less than a set hydraulic pressure, the controller determines that the brake line fails and controls the EPB to be engaged and blocks distribution of the braking hydraulic pressure of the braking circuit.

14. The method of claim 13, wherein the brake line includes a front-wheel brake line and a rear wheel brake line and the braking circuit includes a first braking circuit and a second braking circuit; and wherein determining whether the brake line fails comprises:
detecting braking hydraulic pressure output from the first braking circuit in a state in which a first valve connected to the first braking circuit is opened and a second valve connected to the second braking circuit is simultaneously maintained to be closed; and
detecting braking hydraulic pressure output from the second braking circuit in a state in which the second valve connected to the second braking circuit is opened and the first valve connected to the first braking circuit is simultaneously maintained to be closed.

15. The method of claim 14, wherein when the braking hydraulic pressure output from the first braking circuit is less than the set hydraulic pressure, the controller determines that the front-wheel brake line fails and controls the EPB to be engaged and blocks distribution of the braking hydraulic pressure of the first braking circuit and the second braking circuit.

16. The method of claim 15, wherein after the front-wheel brake line is determined to fail and the EPB is engaged, when a deceleration is equal to or greater than a reference value in a state in which a brake pedal stroke is equal to or greater than a reference stroke, the controller determines a current point as a limit of generating braking force based on engaging of the EPB, and when a vehicle speed is less than a reference speed, the controller releases blocking of distribution of the braking hydraulic pressure of the second braking circuit and then controls the EPB to be completely engaged.

17. The method of claim 14, wherein the controller determines that the rear-wheel brake line fails when the braking hydraulic pressure output from the second braking circuit is less than the set hydraulic pressure and controls the EPB to be engaged and blocks distribution of the braking hydraulic pressure of the second braking circuit.

18. The method of claim 17, wherein, after the rear-wheel brake line fails and the EPB is engaged, when a deceleration is equal to or greater than a reference value in a state in which a brake pedal stroke is equal to or greater than a reference stroke, the controller determines a current point as a limit of generating braking force based on engaging of the EPB, and when a vehicle speed is less than a reference speed, the controller controls the EPB to be completely engaged.

19. The method of claim 14, wherein the controller determines that both the front-wheel brake line and the rear-wheel brake line fail when both the braking hydraulic pressure output from the first braking circuit and the braking hydraulic pressure output from the second braking circuit are less than the set hydraulic pressure, and controls the EPB to be immediately engaged.

20. The method of claim 19, wherein after both the front-wheel brake line and the rear-wheel brake line are determined to fail and the EPB is engaged, when a deceleration is equal to or greater than a reference value in a state in which a brake pedal stroke is equal to or greater than a reference stroke, the controller determines a current point as a limit of generating braking force based on engaging of the EPB, and when a vehicle speed is less than a reference speed, the controller controls the EPB to be completely engaged.

* * * * *